United States Patent [19]

Moen

[11] Patent Number: 4,637,434

[45] Date of Patent: Jan. 20, 1987

[54] THREE-WAY VALVE FOR AN ATTENUATOR

[75] Inventor: Carl J. Moen, Beloit, Wis.

[73] Assignee: Beloit Corporation, Beloit, Wis.

[21] Appl. No.: 742,259

[22] Filed: Jun. 7, 1985

[51] Int. Cl.$^4$ ............................................. F16L 55/04
[52] U.S. Cl. .......................... 137/625.66; 137/625.68; 138/30
[58] Field of Search ...................... 137/625.66, 625.68; 138/30

[56] References Cited

U.S. PATENT DOCUMENTS

| | | | |
|---|---|---|---|
| 2,852,033 | 9/1958 | Orser | 138/30 X |
| 2,886,063 | 5/1959 | Ray | 137/625.27 |
| 2,963,044 | 12/1960 | Hellund . | |
| 3,103,234 | 9/1963 | Washburn . | |
| 3,602,243 | 8/1971 | Holt et al. | 137/625.68 X |
| 3,744,527 | 7/1973 | Mercier . | |
| 3,874,417 | 4/1975 | Clay . | |
| 3,874,509 | 4/1975 | Parker et al. . | |
| 4,030,971 | 6/1977 | Justus . | |
| 4,044,795 | 8/1977 | Taroy et al. | 137/625.68 X |
| 4,169,757 | 10/1979 | Kirjavainen . | |
| 4,262,700 | 4/1981 | Moen . | |
| 4,556,087 | 12/1985 | Casilli | 138/30 |

*Primary Examiner*—Gerald A. Michalsky
*Attorney, Agent, or Firm*—Dirk J. Veneman; Raymond W. Campbell; Gerald A. Mathews

[57] ABSTRACT

A three-way valve for use in a fluid pulsation attenuator having a flexible diaphragm forming an interface with a flow of pulsating fluid on one side and a chamber of pressurized air on the other. The valve includes a head and an attached sliding tube having a plurality of orifices through its wall. As the head follows movement of the diaphragm, the sliding tube moves between positions which permit one or more orifices to communicate with chambers in the valve to either introduce additional pressurized air into the air chamber portion of the attenuator, or to discharge air therefrom, as needed, to quickly achieve matching, at start-up, and the continuance of matching of the air chamber pressure to the running-average pressure of the fluid on the other side of the diaphragm, and thus to keep the diaphragm's average position approximately centered within its range of movement, ready to absorb pulses of either sign.

4 Claims, 4 Drawing Figures

4,637,434

THREE-WAY VALVE FOR AN ATTENUATOR

BACKGROUND OF THE INVENTION

This invention relates to fluid pulsation attenuators, that is, mufflers or acoustic rejection filters for reducing the fluctuations in the flow of fluids in conduits. More specifically, it relates to a valve for controlling the flow of air into and out of the air chamber adjacent one side of the diaphragm in a pulsation attenuator of the type used in the stock conduit feeding an aqueous slurry of stock fibers into the headbox of a papermaking machine. Still more specifically, the invention relates to a three-port, three-way valve wherein the rapid entry and rapid release of air, at start-up and shutdown, and the more leisurely controlling of the air pressure in a chamber on one side of the attenuator diaphragm to quickly achieve matching, and to continue the matching of this air pressure to the running-average pressure of the fluid on the other side, is achieved by movement of a sliding tube within the valve.

Prior valves used in these pulsation attenuators were two-port, two-way valves and were of two general types. In conjunction with either of these valve types, pressurized air was continuously introduced at a selected rate, approximately scaled to chamber volume, into the air chamber adjacent the attenuator diaphragm via a separate air input path. To maintain the required matching of the air chamber pressure to the fluid (typically liquid or fibrous slurry) pressure, and hence keep the diaphragm approximately in the middle of its range of movement, regardless of drifting of the running-average fluid pressure, the two-way port valve regulated the outflow of air from the chamber by bleeding the air therethrough from the chamber. Thus, air was exhausted from the air tank by the diaphragm being momentarily lowered away from the end of the bleed valve, thereby exposing an opening, or openings, in the end of the bleed valve head through which the pressurized air rushed to be discharged to the atmosphere via a connecting pipe. When the air pressure within the attenuator tank balanced, or became slightly less than, the normally slowly drifting, running-average fluid pressure within the attenuator's fluid conduit on which the attenuator's air chamber was mounted, the diaphragm remained or was urged against the hole, or holes, in the valve head to close off air discharging from the air tank through the hole, or holes, to the atmosphere via the connecting, isolated pipe. This temporary blocking of the air-escape route, combined with the continuous inflow of air via the air-input path, permitted the air pressure to build up in the tank again until a slight excess of air pressure overcame the slight suction force arising from the pressure differential across the thickness of the diaphragm at the bleed valve's hole, or holes, and again displaced the diaphragm away from the bleed valve, thus again allowing air to escape through the now exposed hole, or holes, in the valve head. It is important to note that the valve operated to exhaust the air from the attenuator air chamber, but not to introduce air into the tank.

In this first type of two-port bleed-only valve, the valve head protruded below the grid-like portion of the (ceiling-plus-floor) "wall" between air chamber and fluid-flow conduit at a fixed distance. This protrusion of the valve head yielded an average position of the diaphragm which was far enough below the rigid back-up grid that the diaphragm could move freely, within limits, in either upward or downward directions to accommodate either positive or negative pulses with respect to the average pressure and flow.

In the second type of prior attenuator valve configuration, the valve head also contained ports therein which, when not blocked by the diaphragm, permitted air from the attenuator's pressurized air tank to pass over and into the head of the valve, and then, via the output pipe portion of the bleed system, out of the attenuator air chamber to the atmosphere. However, in this other prior configuration, the valve head did not have a fixed protrusion, but instead could retract a short distance, typically one inch, upon arrival of the stock in the attenuator, and remain retracted, nearly flush with the surface of the back-up grid, until the gradually rising air pressure nearly matched the nearly-constant fluid pressure. At that time, the rising air pressure would displace the diaphragm downward away from the back-up grid, and the valve head would follow the diaphragm downward to arrive and remain at its steady-state operating position, furnishing a pre-selected protrusion, typically one inch. Specially designed movability of the valve head allowed the valve to accommodate the initial temporary upward displacement of the diaphragm during the interval of significant mismatch of pressures without producing an undue stress, strain or deformation in it which would have arisen from the localized interference from a fixed-protrusion valve head. With this significant refinement, this type of valve also operated as a bleed valve only, regulating only the escape of air from the attenuator air chamber.

One problem with the first of the prior types of valve, and to a lesser degree with the second type which had modified, multiple holes, arises from the fact that the valve is essentially either open or closed. Further, there is a hysteresis effect since some force is required to break the diaphragm away from the suction at the holes. An example of a typical prior valve head of the first type, showing the holes therein, is illustrated in FIG. 12 of U.S. Pat. No. 4,030,971.

The movement of the diaphragm tends to be rather abrupt, particularly when the valve hole is being opened. These sudden movements of the diaphragm, not related to absorbing any sharp pulse in the fluid, introduce their own pulses (spurious "noise") into the fluid, thus degrading the performance of the attenuator as a reducer of unwanted fluid noise (pulsations).

A second, related problem arises from the fact that both types of valve are used in conjunction with an essentially-constant inflow of air, via a separate channel, to the attenuator air chamber, and this involves a compromise. To pressurize the air chamber, at each start-up, in a reasonable interval of time, the inflow of air should be at a relatively high rate. To avoid the complications of additional control components, the relatively high rate of inflow is retained during subsequent operation of the attenuator. This, in turn, requires the bleed valve to dispose of a relatively large amount of air in a given time, unfortunately increasing the noise generated in the fluid by the suddenness of the operation of the air bleed.

SUMMARY OF THE INVENTION

This invention represents a significant improvement over the relatively extreme, somewhat abrupt operation of each of the two prior types of valves as well as, in the first type, the cumulative effect resulting from repeated intervals (at each machine start-up) of large pressure mismatch between the air pressure on one side of the diaphragm and the fluid pressure on the other side, causing the deformation of the diaphragm over a fixed-protrusion valve. This improvement is accomplished by eliminating the use of the diaphragm directly as an intermittent blocker of the openings in the valve head and instead using the diaphragm only as a contacting and positioning device for causing the valve head to slide along its vertical longitudinal axis, with the consequent motion of an attached tube, with orifices, controlling both the inflow of air to, and the outflow of air from, the attenuator's air chamber.

There are no openings in the valve head at the interface between the diaphragm and valve head. The valve head functions merely as a contact area for the diaphragm allowing the diaphragm to determine the position of the freely-moving valve head and its connected components. There is an intermediate valve position corresponding to the diaphragm being in a neutral position, with compensating minor inflow and outflow of air, corresponding to steady fluid flow through the attenuator. There is a maximum protrusion position of the valve head and connected components corresponding to the diaphragm being excessively displaced downward into the stock flowing in the conduit of the attenuator, with air outflow greatly exceeding almost-zero air inflqw. There is also a fully-retracted-upward position corresponding to the diaphragm being pushed excessively in the opposite direction, into a limiting upward position in contact with the rigid grid of the attenuator, by the temporarily greater pressure of the fluid in the conduit. In this position, air inflow greatly exceeds almost-zero air outflow.

The net introduction of additional pressurized air, or the net exhaust of pressurized air, is a function only of the position of the valve head, and thus a function of the position of a portion of the attenuator diaphragm, and thus a slightly-less-direct function of the average position of the diaphragm as a whole. It has no direct relationship with the degree or shape of contact between the diaphragm and the valve head since there are no longer any ports in the region of contact.

This three-port valve has an air input line, from a selected fixed pressure source; it has an air output line to the atmosphere; and it has a common port to the air chamber. It can be regarded as a three-way valve with the added feature of a mostly-gradual transition from one extreme, through a neutral position, to the other extreme. There is a dead-band range of positions at and near "neutral" where slight movement of the valve head does not result in any significant change in air input or output. However, the dependence of net flow on valve displacement increases greatly as either of the two extreme positions is approached.

This arrangement eliminates the abrupt opening and closing of the valve inherent in the first type of two-port valve and, to a reduced extent, in the second type. Such abruptness was a byproduct of the making and breaking of contact, or even a change in the area of contact, between the diaphragm and valve head. Performance such as that resulting from rapid opening and closing of the valve, leading essentially to one or the other of two extreme operating states, is referred to in the industry as "bang-bang" operation. Here, "bang-bang" operation refers to a combination of one state involving the introduction of new, pressurized air into the air tank when the tank is underpressurized, and the abrupt transition to, or from, a second state involving the exhaust of air from the tank when the tank is overpressurized. Here, such "bang-bang" operation, particularly if quite abrupt and if the changes are of large magnitude, is undesirable and conducive to poor operational results, such as promoting the introduction of noise into the fluid, as well as conducive to more rapid (but not severe) wear-and-tear on the diaphragm as it slaps against the ported valve head.

In this invention, abrupt, large changes in net air flow are eliminated. In normal operation, with the valve head in or near the dead-band region, the dependence on position of net air flow is slight, but scaled to the volume of the air chamber to furnish the needed degree of control. However, the dependence of net air flow on position more-than-proportionately increases with the distance the valve head travels away from its neutral position, becoming quite sharp as either of the two extremes is approached. This permits rapid filling of the air tank for start-up and rapid discharge under conditions of extreme pressure mismatch in the opposite direction.

Accordingly, it is an object of this invention to provide an attenuator valve which does not abruptly shift between open and closed positions, except to compensate for temporary abnormal conditions.

It is another object of this invention to provide an attenuator valve having fully-protruding, intermediate and fully-retracted positions, with smooth and graded transitions of net flow of air throughout the intervening range of positions.

It is another object of this invention to provide an attenuator valve which utilizes a sliding tube with selected and scaled orifices for changing between open and closed positions, and for controlling net flow at intermediate positions as well.

A feature of this invention is an attenuator valve having a head containing no air inlet qr outlet ports.

An advantage of this invention is an attenuator valve which operates smoothly with, in normal operation, no abrupt changes in net air flow which would generate noise in the fluid whose pulsation is to be reduced by the attenuator whereof the valve is a component.

A feature of this invention is its ability, at start-up, to rapidly pressurize the attenuator air chamber, without requiring the retaining of this high inflow of air—and an approximately-matching high outflow of air—during normal operation thereafter, and without the complication of a reliable temporarily-functioning fast-fill supplement.

Still another feature of the invention is the capability of the valve to permit high outflow of air at the other extreme (downward) of valve position, to protect the diaphragm from temporary high stressing during certain conditions of rapid large drop in fluid pressure encountered during changes in normal operation of a papermaking machine, such as during changes in the type of paper being made.

Other objects, features and advantages of this invention will become readily apparent to those skilled in the art when the following detailed description of the preferred embodiment is read in conjunction with the attached drawings.

DESCRIPTION OF THE PREFERRED EMBODIMENT

Figure 1:
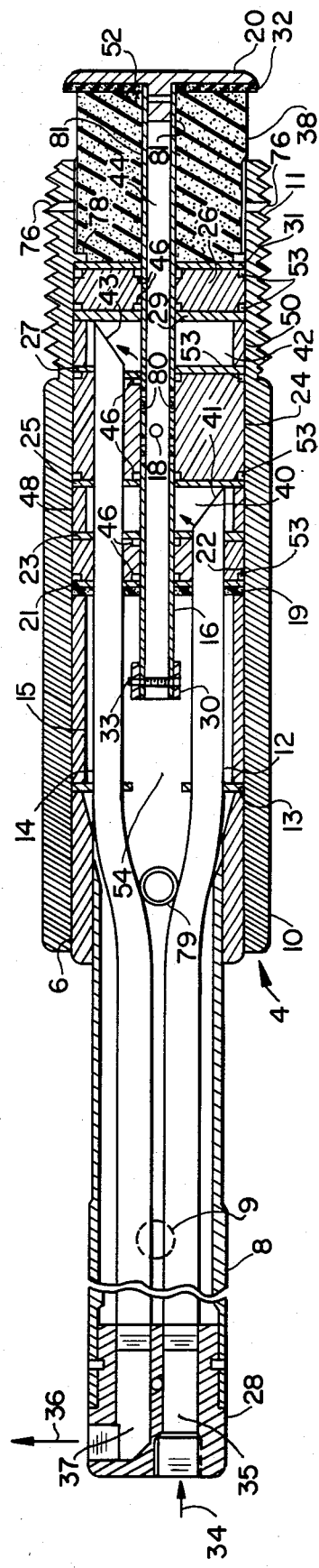
FIG. 1 is a longitudinal cross-section elevational view of the three-way valve.
Figure 2:
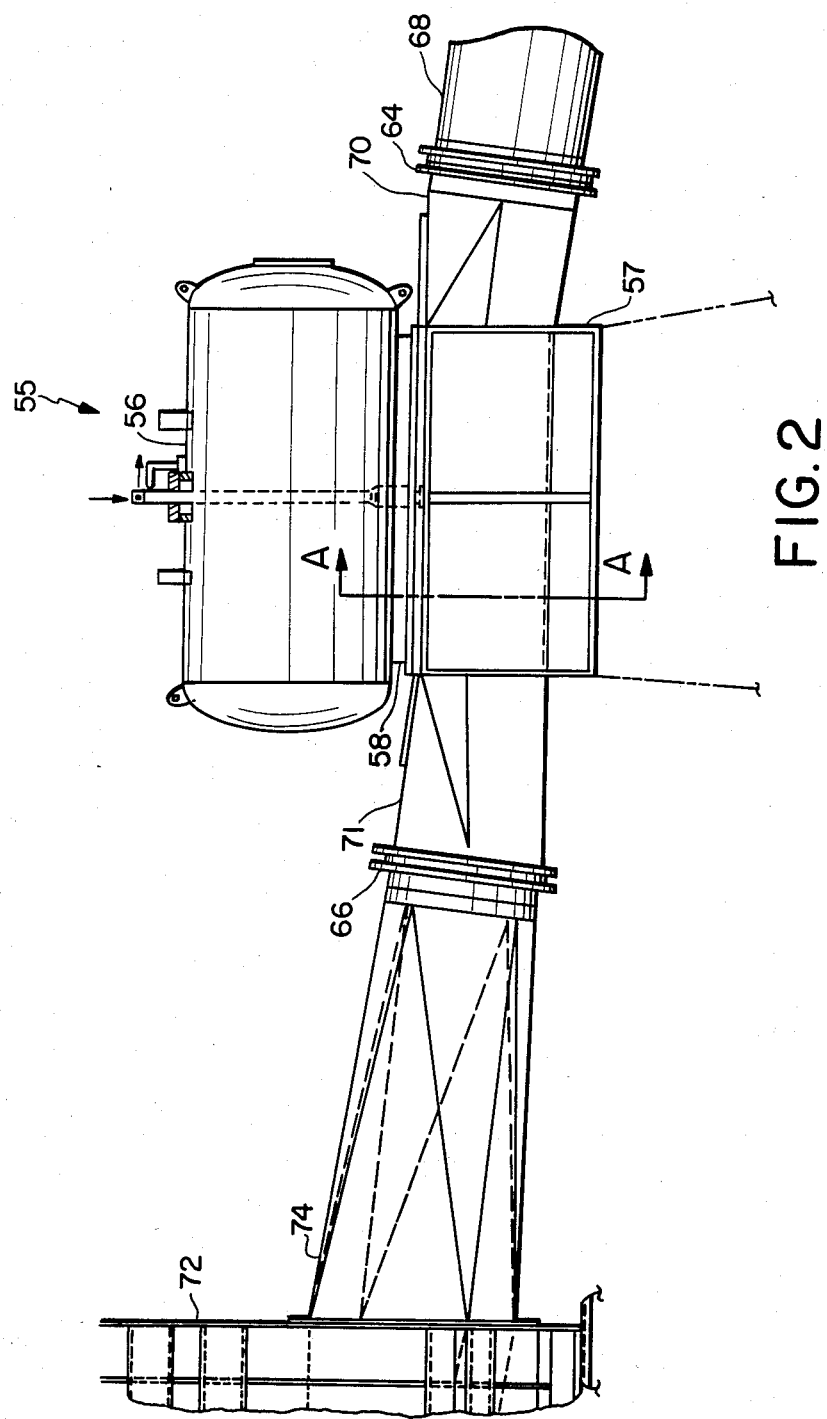
FIG. 2 is an elevational view of an attenuator mounted in the stock conduit leading into a papermaking machine headbox and showing the air tank in which the three-way valve is disposed.
Figure 3:
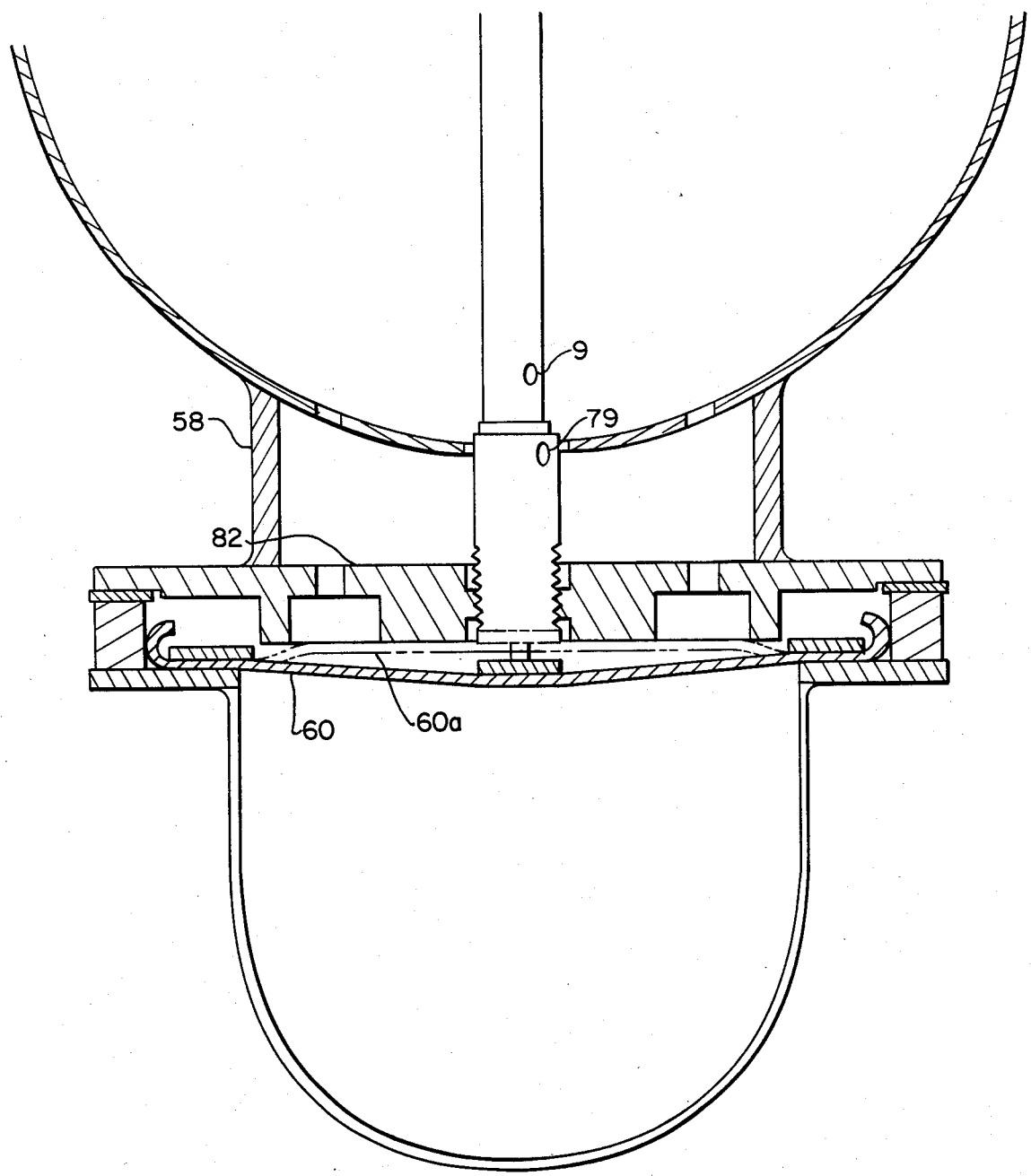
FIG. 3 is a section view along lines A—A, partially schematic, of the lower part of the attenuator air tank and conduit in FIG. 2.

As shown in FIG. 1, the three-way valve 4 has a tubular casing 10 with a bushing 6 fitted into its upper end, forming a mechanical junction with a long pipe 8, while its lower end is threaded at 11 to screw into the grid-like wall 82 (FIG. 3) of an air-pressurized attenuator air tank 56 (FIG. 2) in which it operates. This threaded mounting permits adjustment during installation of the valve elevation and hence the selecting of the operating range of valve head position relative to the grid and hence relative to the attenuator diaphragm 60 (FIG. 3). Within and near the lower end of the casing is a machined cylindrical ledge 78 which, along with the accurately machined bore of the casing 10, furnishes the precise alignment of internal components, to be described in more detail below, required for smooth, non-sticking, continuous operation of the valve.

Extending upwardly out of the bushing 6 is a long pipe 8 which extends from near the bottom of the air chamber to above the top of the air tank 56. It has a fitting 28 at its upper end as shown in FIGS. 1 and 2. Two drilled and tapped holes 35,37 are formed in the end fitting 28 to provide for the introduction and exhaust, respectively, of pressurized air into and from the valve in the direction of arrows 34,36, respectively. Two corresponding air inlet and air outlet tubes 12,14, which are slightly flexible, are screwed into the inlet and outlet holes 35,37, respectively, to channel the pressurized air to and from first and second chambers 40,42, to be described below, within the valve.

Below the lower end of the casing 10 and attached to the lower end of sliding tube 16, to be described below, is the valve head 20. The valve head has a smooth, slightly rounded, unperforated face for contacting the attenuator diaphragm and moving the sliding tube while preventing air from passing through the valve head.

Also disposed within the casing 10 of the valve 4 are upper, center and lower sealing plugs 22,24,26, respectively, which are spaced apart to define first and second chambers 40,42 disposed along the longitudinal axis of the valve. A tubular spacer 15 extends along the inner wall of casing 10 between guide 13, which abuts the bushing 6, and a reinforced elastomer upper bumper 19 adjacent to upper plate 21, one of a pair of circular plates 21,23 on either side of and bolted to the upper sealing plug 22. Similarly, a tubular spacer 48 extends between upper sealing plug 22, lower plate 23 and center sealing plug 24 and upper plate 25. Finally, a tubular spacer 50 extends between center sealing plug 24, lower plate 27 and lower sealing plug 26 and upper plate 29. On the lower side of and bolted to the lower plug 26 is a last circular plate 31 which abuts against the previously-described alignment ledge 78.

A hole, counterbored at each end, is furnished in the center of each of the sealing plugs 22,24,26 and a low-friction air-sealing guide O-ring 46 is inserted in the counterbore at each end of the center hole in each of the sealing plugs to slidably receive a sliding tube 16. The counterbore in which each of the six O-rings 46 is inserted is made with oversized diameter, furnishing a radial gap, but is snug, with no gap, in the axial direction relative to the dimensions of the O-rings, so as to provide a self-alignment feature relative to the sliding tube 16 to accommodate any slight (imperfections in the alignment of the six counterbores in the three plugs 22,24,26, while still sealing the tube surface against escape of air therealong during its sliding passage inside the sealing plugs 22,24,26.

These six O-rings 46 are held in position by the six plates 21,23,25,27,29,31 which also constrain the large elastomer O-rings 53 at the periphery of the three air sealing plugs 22,24,26 which air-seal the plugs with the bore of the valve casing 10. Each subassembly of sealing plug, upper plate, and lower plate and inner and outer O-rings is bolted together by two longitudinally-extending screws in accurately-positioned holes. These holes and these screws, mentioned previously, are not shown in the figures.

Figure 4:
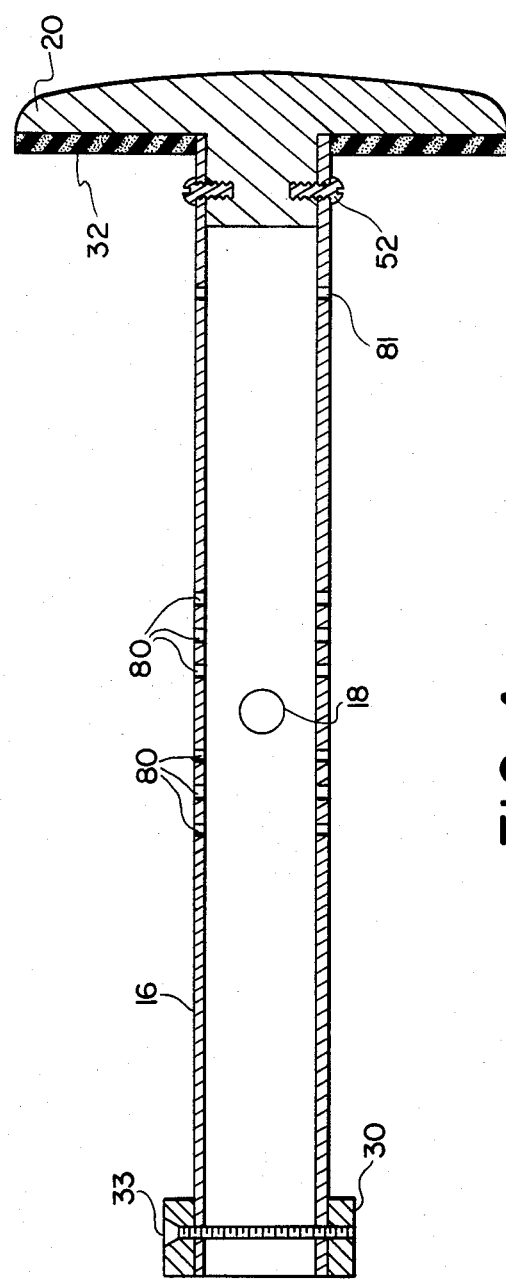
FIG. 4 is an enlarged, cross-section view of the sliding tube and head and directly-attached components shown in the assembly of FIG. 1.

The sliding tube 16 extends between a stub on the inner side of valve head 20 where it is attached by two screws 52, upwardly into the valve through the aligned center holes in all three sealing plugs 22,24,26 and beyond the upper bumper 19 to an upper end which has a stop 30 attached thereto by a screw 33. As shown in FIGS. 1 and 4, sliding tube 16 has two large holes 18 at an accurately-located axial position near mid-length and several pairs of smaller orifices 80. The orifices of each pair are located diametrically-opposite each other in the tube and the pairs are spaced at selected intervals, axially, toward either end of the tube. In other versions of the tube, these small hole pairs are replaced by narrow slots not shown.

The areas of these large holes 18 and the small orifices 80 are scaled approximately proportional to the volume of the attenuator air chamber. This keeps the rates of change of pressure with time and with position of tube roughly independent of air chamber volume (i.e. size of attenuator).

Within, and partially below, the bottom of casing 10, in some versions of the valve, there is an easily-compressible, porous cylindrical polyurethane foam spring 38 which has a central hole to accommodate the sliding tube. This spring 38 also would function as a strainer to keep out stock fibers in the improbable event of rupture of the diaphragm during operation. A disc lower bumper 32 made of reinforced elastomer with a central hole is mounted between the bottom of the spring 38 and the upper surface of the valve head 20, and serves as a buffer between the hard valve head 20 and the bottom surface of the hard casing 10 when the head-plus-tube combination is in its fully-upward-retracted position.

To additionally secure the valve assembly, two diametrically opposite holes are drilled through each of the concentrically mating casing 10, bushing 6 and pipe 8 to accommodate a screw 79. This screw 79 together with aligning ledge 78 serve to hold and align the components within the casing.

Holes 9 are drilled through the pipe 8 to provide flow of air between the inner space 54 (and the interior 44 of the tube 16) and the exterior of the valve which is disposed within the pressurized air tank 56.

FIG. 2 shows the location of the attenuator 55 relative to the contiguous and adjacent components on a papermaking machine. The three-way valve 4 is disposed vertically therein with its air inlet and outlet fitting 28 extending out its top. This attenuator broadly comprises a fluid flow channel in a lower, box-like section 57 over which an air tank 56 is attached by a narrow, rectangular interface section 58 which contains a back-up grid and diaphragm 60 which are not shown in FIG. 2 because they are within the interface section 58, but which are shown in FIG. 3.

The attenuator 55 per se is a unit which can be inserted in the stock conduit 68 leading from the fan pump (not shown) and other items, such as a pressure screen, on a papermaking machine at a leading transition coupling 66 and a trailing transition piece 71. These transition couplings enable the circular stock conduit to adapt to the non-circular, prism shape of the fluid flow channel portion of the attenuator base 57 and, in turn, to be adapted to another headbox transition piece 74 which is specially shaped to introduce the stock into the headbox of the papermaking machine through a specially configured opening in the headbox pondside 72.

In operation, the attenuator does not absorb the energy of any pulsations passing through the stock in the conduit leading to the papermaking machine headbox, but instead serves as an acoustic near-short-circuit and reacts to any such pressure-and-flow pulsations to reflect them. This action includes movement of the flexible diaphragm 60 upwardly and/or downwardly to track those components of the pulsation lying within the frequency range of the attenuator.

For greatest attenuating sensitivity and signal-handling capability, it is desirable to keep the diaphragm approximately in the middle of its range of movement. A precise controlling of the air chamber's air pressure to match the running-average fluid pressure in the conduit would accomplish this, but, in practice, the required precision of pressure control, directly, is difficult to achieve. A more realistic approach is to monitor and control the average position of a portion of the diaphragm itself. This ensures that the remaining major portion of the typically-horizontal diaphragm also remains approximately centered.

When there is an increase in the running-average fluid pressure, valve head 20 is pushed upwardly against the slight spring force of the foam spring 38 and the inertial and frictional components of valve impedance. This, in turn causes the attached sliding tube 16 to move upwardly by the same amount. Small upward (or downward) movements of the diaphragm and sliding tube do not cause any significant response by the attenuator valve since, at and near the valve's neutral position, all of the orifices 80 and holes 18 are positioned within sealing plug 24 which prevents any significant entry of new air into the attenuator's air tank or exhaust of air therefrom. To be precise, there is slight leakage past the low-friction O-rings 46, both into and out of the air tank via the valve, but the net flow is virtually zero which yields the small dead-band region near the neutral mid-position, the position shown in FIG. 1.

However, further upward movement of diaphragm 60, valve head 20 and tube 16 results in the sequential exposure of two or more orifices 80 past the uppermost of the O-rings 46 in the plug 24 and into the first chamber 40. This permits pressurized air, entering the valve in the direction of arrow 34, through hole 35, tube 12, air outlet 41, and chamber 40, to pass into the inner cavity 44 of sliding tube 16 and into inner space 54 and into the air tank 56 through connecting ports 9. The rate at which this pressurized air enters the attenuator tank depends on the number of pairs of orifices 80 which have been exposed in first chamber 40 which, in turn, is a function of the upward movement of the diaphragm and valve head 20.

Orifices 80 can be of various configurations, such as slots or holes, as mentioned earlier. Slots provide a more gradual transition and exposure of the air entering the tube 16, but holes are easier to make.

If the increase in fluid pressure is great enough and/or is repeated often enough, there will be a detectable rise in the pressure of the air in the chamber 56 serving to furnish a compensating force to move the diaphragm's average position and the valve head's average position, downwardly, imperceptibly above their former positions, as desired.

A greater increase in the running-average fluid pressure will expose still more of the orifices 80 in the sliding tube to the upper chamber 40, and the rebalancing of the pressures will proceed at a greater rate. If there is a very large excess of fluid pressure, an abnormal condition usually encountered only at start-up when the air chamber is initially at atmospheric pressure only, the two large holes 18 in the sliding tube 16 will become exposed to the upper chamber 40 and the net inflow of air will be much higher to permit still faster response to this extreme position which is illustrated, for example, by the 60a position of the diaphragm in FIG. 3.

Analogously, for very small, intermediate, and very large decreases in fluid pressure, the orifices 80 in the sliding tube 16 below the larger holes 18 gradually attain greater communication with the lower, second chamber 42, as the diaphragm moves downwardly past its neutral position into the stock conduit in the attenuator base and there is an increase in the net outflow of air from the air chamber via ports 9, inner space 54, through the inner chamber 44 of sliding tube 16, out of the orifices 80 to the second chamber 42, into the end 43 of outlet tube 14, and finally out through outlet hole 37 to the atmosphere in the direction of arrow 36.

Two small air-vent holes 81 are located near the bottom of tube 16, and two small air-vent holes 76 are located in the lower portion of casing 10. They furnish an air path between the inner bottom region of the casing 10 and the air chamber. At each start-up, and/or at any other time when the tube-plus-head combination is in the fully-retracted-upward position, the soft lower bumper 32 would otherwise act as a gasket between the valve head 20 and the bottom surface of the casing 10, temporarily sealing off and isolating this inner lower volume of the casing 10 from the air chamber. Without the air-vent holes 80 and 76, this isolated cavity (incidentally, normally largely filled with foam 38) would not experience the increase in air pressure experienced by the air chamber at start-up, and the increasing pressure differential, acting on the area of (approximately) the valve head 20, would furnish enough upward force that the tube-plus-head combination might be prevented from moving downward (and furnishing control) as the air chamber pressure rises to match the fluid pressure.

Accordingly, a three-way valve for attenuators has been described and illustrated which incorporates the features and advantages and provides the objects which have been set forth. It is anticipated that modifications in the apparatus and its operation may become readily apparent to those skilled in the art, particularly after reading this disclosure, without departing from the spirit and scope of this invention as defined in the following claims.

I claim:

1. A three-way valve for use in a fluid pulsation attenuator type having a flexible diaphragm disposed to move between lower, neutral and upper positions, the diaphragm having one side thereof contacting the fluid having pulsations to be attenuated and the other side disposed to contact the valve, the valve comprising:
- an elongate, hollow casing extending within the attenuator having an air inlet for introducing air thereinto, an air outlet for releasing exhaust from the interior thereof;
- first and second chambers within the casing, spaced apart therein, and in fluid communication with the air inlet and air outlet, respectively;
- a valve head for non-secured, contacting engagement with the diaphragm;
- a bore within the casing, said bore having a soft spring means interposed between the valve head and a plate within the bore on one end of the casing;
- an elongate sliding tube slidably disposed within the casing having one end attached to the valve head and the other end terminating within the casing, said sliding tube including a plurality of orifices in the wall thereof, said orifices disposed between said first and second chambers when the sliding tube is in its neutral position, and movable between the first and second chambers following corresponding movement of the valve head against the diaphragm, said movement of the orifices into the first and second chambers establishing air communication therebetween and the interior of the casing via the sliding tube;
- port means in the casing linking the interior of the casing with the exterior thereof, whereby reciprocal movement of the sliding tube permits selective air communication between the first and second chambers with the interior of the attenuator air tank.

2. The three-way valve as set forth in claim 1, wherein:
- the first and second chambers are spaced apart a distance in the direction of sliding tube travel corresponding to a distance equal to not more than about twice the permissible amplitude of the diaphragm in either direction;
- the sliding tube passes through the first and second chambers;
- the orifice means within the sliding tube is located midway between the first and second chambers when the sliding tube is in its neutral position.

3. The three-way valve as set forth in claim 1, wherein:
- the sliding tube is open at the end opposite the valve head whereby the orifices communicate directly with the interior of the casing and air outlet port.

4. The three-way valve as set forth in claim 1, wherein:
- the orifices in the sliding tube comprise at least one central hole disposed intermediate the first and second chambers when the sliding tube is in its neutral position corresponding to the attenuator diaphragm being in its neutral, or steady-state position;
- the orifices in the sliding tube include at least one additional orifice on either side of the central hole, longitudinally therealong, whereby said additional orifice comes into air communication with one of the first or second chambers before the central hole as the sliding tube translates in its movement so as to vary the rate of air communication as a function of extension of the sliding tube from its neutral position.

* * * * *